US008924703B2

(12) United States Patent
Wu et al.

(10) Patent No.: US 8,924,703 B2
(45) Date of Patent: *Dec. 30, 2014

(54) SECURE VIRTUALIZATION ENVIRONMENT BOOTABLE FROM AN EXTERNAL MEDIA DEVICE

(71) Applicant: Citrix Systems, Inc., Fort Lauderdale, FL (US)

(72) Inventors: Zhixue Wu, Cambridge (GB); David Otway, Cambridge (GB); Robert van der Linden, Cambridge (GB); James Rabey, Terrigal (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,763

(22) Filed: Sep. 30, 2013

(65) Prior Publication Data

US 2014/0032893 A1 Jan. 30, 2014

Related U.S. Application Data

(63) Continuation of application No. 12/968,066, filed on Dec. 14, 2010, now Pat. No. 8,560,826.

(60) Provisional application No. 61/286,210, filed on Dec. 14, 2009.

(51) Int. Cl.
| | |
|---|---|
| H04L 29/06 | (2006.01) |
| G06F 21/57 | (2013.01) |
| G06F 9/44 | (2006.01) |
| G06F 9/455 | (2006.01) |
| G06F 21/74 | (2013.01) |

(52) U.S. Cl.
CPC ............ G06F 21/572 (2013.01); G06F 9/4401 (2013.01); G06F 9/45558 (2013.01); G06F 21/57 (2013.01); G06F 21/74 (2013.01); G06F 2009/45579 (2013.01); G06F 2009/45587 (2013.01)
USPC .............................................. 713/2; 713/100

(58) Field of Classification Search
USPC ...................................................... 713/2, 100
See application file for complete search history.

(56) References Cited

U.S. PATENT DOCUMENTS

| | | | |
|---|---|---|---|
| 4,887,202 A | 12/1989 | Tanaka et al. | |
| 5,900,024 A | 5/1999 | Morearty | |

(Continued)

FOREIGN PATENT DOCUMENTS

| | | |
|---|---|---|
| CN | 1700171 | 11/2005 |
| KR | 10200480283 | 9/2004 |

(Continued)

OTHER PUBLICATIONS

Dubnicki, D. et al, Design and implementation of virtual memory-mapped communication on Myrinet, IN: the 11th international parallel processing symposium, Apr. 1-5, 1997, IEEE, pp. 388-396: (Dubnicki, D. et al) See abstract, chapter 2, and 4.5.

(Continued)

*Primary Examiner* — Kambiz Zand
*Assistant Examiner* — Michael Guirguis
(74) *Attorney, Agent, or Firm* — Foley & Lardner LLP; John D. Lanza

(57) ABSTRACT

Methods and systems for creating a secure virtualization environment on a host device, without modifying the host device, the secure virtualization environment bootable from an external media device. A host computing device loads and boots a common operating system image stored on an external media device. A client agent stored on the external media device and executing in the common operating system image creates an adapted operating system image by copying the operating system of the host computing device, eliminating all unnecessary files and data and storing the adapted operating system image to the external media device. The host computing device provides a secure virtualized environment by booting the adapted operating system image.

20 Claims, 10 Drawing Sheets

(56) References Cited

U.S. PATENT DOCUMENTS

| | | | |
|---|---|---|---|
| 6,131,901 | A | 10/2000 | Hirohata |
| 6,453,392 | B1 | 9/2002 | Flynn, Jr. |
| 7,380,049 | B2 | 5/2008 | Rajagopal et al. |
| 7,716,377 | B2 | 5/2010 | Harris et al. |
| 7,757,231 | B2 | 7/2010 | Anderson et al. |
| 7,937,701 | B2 | 5/2011 | Kinney et al. |
| 8,099,274 | B2 | 1/2012 | Bohizic et al. |
| 8,145,836 | B2 | 3/2012 | Nelson et al. |
| 8,181,253 | B1 | 5/2012 | Zaitsev et al. |
| 8,261,320 | B1 | 9/2012 | Serenyi et al. |
| 8,453,144 | B1 * | 5/2013 | Keagy et al. ............ 718/1 |
| 2001/0034736 | A1 * | 10/2001 | Eylon et al. ............ 707/200 |
| 2003/0126242 | A1 * | 7/2003 | Chang ............ 709/222 |
| 2005/0091530 | A1 | 4/2005 | Avraham et al. |
| 2005/0102671 | A1 | 5/2005 | Baumberger |
| 2005/0210158 | A1 | 9/2005 | Cowperthwaite et al. |
| 2005/0216920 | A1 | 9/2005 | Tewari et al. |
| 2005/0228921 | A1 | 10/2005 | Sethi et al. |
| 2005/0235068 | A1 | 10/2005 | Moriki et al. |
| 2005/0246453 | A1 | 11/2005 | Erlingsson et al. |
| 2005/0268095 | A1 | 12/2005 | O'Connor |
| 2006/0075264 | A1 | 4/2006 | Willman et al. |
| 2006/0146057 | A1 | 7/2006 | Blythe |
| 2006/0200616 | A1 | 9/2006 | Maliszewski |
| 2006/0206702 | A1 | 9/2006 | Fausak |
| 2006/0256105 | A1 | 11/2006 | Scarlata et al. |
| 2007/0162521 | A1 * | 7/2007 | Raghunath ............ 707/202 |
| 2007/0182714 | A1 | 8/2007 | Pemmaraju |
| 2007/0240212 | A1 | 10/2007 | Matalytski |
| 2008/0005320 | A1 | 1/2008 | Chen |
| 2008/0091934 | A1 | 4/2008 | Peterson et al. |
| 2008/0126614 | A1 | 5/2008 | Ooi et al. |
| 2008/0172555 | A1 | 7/2008 | Keenan |
| 2009/0019442 | A1 | 1/2009 | Liu |
| 2009/0089879 | A1 | 4/2009 | Wang et al. |
| 2009/0102838 | A1 | 4/2009 | Bullard et al. |
| 2009/0125902 | A1 | 5/2009 | Ghosh et al. |
| 2009/0172663 | A1 | 7/2009 | Sahita et al. |
| 2009/0204964 | A1 | 8/2009 | Foley et al. |
| 2009/0210888 | A1 | 8/2009 | Lee et al. |
| 2009/0222814 | A1 | 9/2009 | Astrand |
| 2010/0011219 | A1 | 1/2010 | Burton et al. |
| 2010/0174924 | A1 | 7/2010 | Banga et al. |
| 2011/0029699 | A1 | 2/2011 | Siegman et al. |
| 2011/0047618 | A1 * | 2/2011 | Evans et al. ............ 726/23 |
| 2011/0050712 | A1 | 3/2011 | Jackson |
| 2011/0141124 | A1 | 6/2011 | Halls et al. |
| 2012/0166653 | A1 | 6/2012 | Twitchell |
| 2012/0240224 | A1 | 9/2012 | Payne et al. |
| 2012/0278818 | A1 | 11/2012 | Green et al. |

FOREIGN PATENT DOCUMENTS

| | | |
|---|---|---|
| KR | 10775887 | 11/2007 |
| KR | 10792786 | 1/2008 |
| WO | WO-00/43876 | 7/2000 |

OTHER PUBLICATIONS

Ghodke; Virtualization techniques to enable transparent access to peripheral devices across networks, University of Florida 2004.
International Preliminary Report on Patentability on PCT/US2010/060309 dated Jun. 28, 2012.
International Preliminary Report on Patentability on PCT/US2010/060329 dated Jun. 28, 2012.
International Search Report on PCT/US2010/060309 dated Sep. 1, 2011.
International Search Report on PCT/US2010/060329 dated Aug. 30, 2011.
Notice of Allowance on U.S. Appl. No. 12/967,348 dated Sep. 19, 2013.
Notice of Allowance on U.S. Appl. No. 12/968,066 dated Jun. 18, 2013.
Office Action on U.S. Appl. No. 09 12/968,084 dated Nov. 13, 2012.
Office Action on U.S. Appl. No. 09 12/968,084 dated May 23, 2013.
Office Action on U.S. Appl. No. 12/967,348 dated May 7, 2013.
Office Action on U.S. Appl. No. 12/967,348 dated Sep. 13, 2012.
Office Action on U.S. Appl. No. 12/967,358 dated Mar. 22, 2013.
Office Action on U.S. Appl. No. 12/967,358 dated Aug. 24, 2012.
Office Action on U.S. Appl. No. 12/967,362 dated Jun. 18, 2013.
Office Action on U.S. Appl. No. 12/968,066 dated Dec. 12, 2012.
Office Action on U.S. Appl. No. 12/968,077 dated Jun. 19, 2013.
Office Action on U.S. Appl. No. 12/968,082 dated Jun. 12, 2013.
Office Action on U.S. Appl. No. 12/968,091 dated Apr. 8, 2013.
Office Action on U.S. Appl. No. 12/968,091 dated Sep. 11, 2013.
Okhravi, H. And Nicol, D., TrustGraph: Trusted Graphics Subsystem for High Assurance Systems, in ACSAC '09: Proceedings of the 2009 Annual Computer Security Applications Conference (Washington, DC, USA, 2009), IEEE Computer Society, pp. 254-265.
Written Opinion on PCT/US2010/060309 dated Sep. 1, 2011.
Written Opinion on PCT/US2010/060329 dated Aug. 30, 2011.
Chinese Office Action on 201080063762.6 dated Apr. 25, 2014.
Extended European Search Report on 10841530.8 dated Jun. 12, 2014.
Notice of Allowance U.S. Appl. No. 12/967,358 dated Oct. 3, 2013.
Notice of Allowance on U.S. Appl. No. 12/967,362 dated Oct. 9, 2013.
Notice of Allowance on U.S. Appl. No. 12/968,069 dated Jun. 27, 2014.
Notice of Allowance on U.S. Appl. No. 12/968,082 dated Oct. 4, 2013.
Notice of Allowance on U.S. Appl. No. 12/968,084 dated Nov. 12, 2013.
Office Action on U.S. Appl. No. 12/968,069 dated Nov. 19, 2013.
Office Action on U.S. Appl. No. 12/968,077 dated Oct. 28, 2013.
Office Action on U.S. Appl. No. 12/968,091 dated Dec. 2, 2013.
Office Action on U.S. Appl. No. 12/968,091 dated May 27, 2014.
Zhiqun Chen: "Java Card Technology for Smart Cards: Architecture and Programmers Guide", Internet Citation, Jun. 2, 2000, XP002167366, Retrieved from the Internet: URL:http://developer.java.sun.com/developer/Books/consumerproducts/javacard/ch09.pdf [retrieved on Aug. 5, 2001].
Chinese Office Action on 2010800637753 dated Sep. 11, 2014.

* cited by examiner

SECURE VIRTUALIZATION ENVIRONMENT BOOTABLE FROM AN EXTERNAL MEDIA DEVICE

CROSS-REFERENCE TO RELATED APPLICATIONS

This present application is continuation of U.S. patent application Ser. No. 12/968,066, titled "SECURE VIRTUALIZATION ENVIRONMENT BOOTABLE FROM AN EXTERNAL MEDIA DEVICE" filed Dec. 14, 2010, now allowed, which claims priority to U.S. Provisional Application No. 61/286,210, entitled "Secure Virtualization Environment Bootable from an External Media Device," filed Dec. 14, 2009, which are both incorporated herein by reference in their entirety for any and all purposes.

FIELD OF THE DISCLOSURE

This application generally relates to streaming applications. In particular, this application relates to a secure computing environment bootable from an external media device.

BACKGROUND

As the number of mobile employees, remote employees, guest employees and task-based employees increases, so does the need for computing systems that restrict the information available to each type of employee, and isolate an employee's personal data from work-related data. Many companies provide their employees with laptops, remote access to the company's intranet, remote access to applications used by an employee, remote access to an employee's files, and access to remote desktops, virtual machines, or remote applications. In many instances, employees can access company resources from any geographical location, using any machine and/or network.

The increasing need for extremely portable computing environments that provide users with the same computing experience across different endpoints and access scenarios has spawned a number of different solutions. Among them include solutions that execute virtual machines in a server environment, and then migrate those virtual machines from one physical host machine to another one without shutting down or losing any data. Other solutions include portable virtual machines that provide a portable boot image. These solutions present a number of challenges because there are often application and driver compatibility issues, and the system footprints often remain on the individual desktop machine thereby compromising security.

SUMMARY

In one aspect, described herein are methods and systems for creating a portable computing environment and in particular a portable virtual machine. Other portable virtualization environments can include a portable virtual machine within a portable virtualization environment, or a portable boot image that takes advantage of application repackaging. These approaches can suffer from driver incompatibility issues and security holes. In particular, these approaches can leave a footprint of the virtualization environment on the host machine, thereby potentially leaking secure information. Application repackaging can be disadvantageous because of application compatibility issues.

The methods and systems described herein create a portable virtualization environment from an adapted OS image that is derived from the OS of the host machine. There are little to no compatibility issues because the adapted OS image is derived from an OS that already works with the devices of the host machine. Further, the virtualization system described herein is a fully functional virtualization environment within which applications can be installed therefore there are few application compatibility issues.

By allowing the computing device to boot from the adapted OS image and not the host operating system, the virtualization environment is a secure environment. This environment is not exposed to viruses executing within the host OS or the host applications, therefore there is little to no exposure to viruses. Further, the information generated while using the adapted OS image is stored on the external media device thereby ensuring that no secure information is copied onto or left on the host computing device.

The virtualization environment is stored substantially entirely on the external media device, therefore neither the adapted OS image on the external media device nor the applications on the external media device can access the hard drives of the host machine. The user files are stored in the virtual file system on the external media device which ensures that users can carry their work from one machine to another, but also ensures that no footprint of the user OS or the user's files are left on the host machine.

In its broadest interpretation, this disclosure describes methods and systems for a secure virtualization environment bootable from an external media device. In one aspect, the present invention is related to a method for creating a secure virtualization environment on a host device, without modifying the host device, the secure virtualization environment bootable from an external media device. A host computing device loads a common operating system image stored on an external media device. The host computing device boots the loaded common operating system image. A client agent executing in the common operating system image creates an adapted operating system image by copying the operating system of the host computing device, eliminating unnecessary files and data, and storing the adapted operating system image on the external media device. The host computing device provides a secure virtualized environment by booting the adapted operating system image.

In some embodiments the client agent installs a streaming client into the adapted operating system image. The client agent generates a virtual file system. The streaming client streams applications from the secure virtualized environment.

In some embodiments, the client agent stores the virtual file system on the external media device outside of the adapted operating system image and the common operating system image. In some embodiments, the streaming applications utilize user data stored in the virtual file system stored on the external media device. In some embodiments, the client agent analyzes the operating system of the host computing device to determine whether viruses, spyware, or corrupt files are present on the host computing device. In some embodiments, the client agent updates the adapted operating system image to reflect the external media device as the primary hard drive. In some embodiments, the client agent determines that an existing adapted operating system image was not derived from the operating system of the host computing device and eliminates the existing adapted operating system image from the external media device.

In another aspect, the present invention is directed to a method for creating a secure virtualization environment on a host device, without modifying the host device, the secure virtualization environment bootable from an external media device. A host computing device loads a common operating system image stored on an external media device. The host computing device boots the loaded common operating system image. A client agent executing in the common OS image determines that an adapted operating system image on the external media device was derived from an operating system of the host computing device. The client agent identifies differences between the operating system of the host computing device and the adapted operating system image. The client agent modifies the adapted operating system image to correspond to the operating system of the host computing device. The host computing device provides a secure virtualized environment by booting the adapted operating system image.

In some embodiments, the client agent installs a streaming client into the adapted operating system image. The client agent generates a virtual file system and the streaming client streams applications from the secure virtualized environment.

In some embodiments, the client agent stores the virtual file system on the external media device outside of the adapted operating system image and the common operating system image. In some embodiments, the streaming applications utilize user data stored in the virtual file system stored on the external media device. In some embodiments, the client agent analyzes the operating system of the host computing device to determine whether viruses, spyware, or corrupt files are present on the host computing device. In some embodiments, the client agent updates the adapted operating system image to reflect the external media device as the primary hard drive.

In another aspect, the present invention is directed to a system for creating a secure virtualization environment on a host device, without modifying the host device, the secure virtualization environment bootable from an external media device. The system includes a host computing device and an external media device. The host computing device loads and boots a common operating system image stored on an external media device and provides a secure virtualized environment by booting an adapted operating system image. The external media device includes an image creator. The image creator determines that the adapted operating system image was derived from an operating system of the host computing device, identifies differences between the operating system of the host computing device and the adapted operating system image, and updates the adapted operating system image responsive to the identification.

In some embodiments, the image creator installs a streaming client into the adapted operating system image. The client agent or image creator generates a virtual file system and the streaming client streams applications from the secure virtualized environment. In some embodiments, the image creator determines the adapted operating system image was not derived from the operating system of the host computing device, updates the adapted operating system image by creating a new operating system image using the operating system of the host computing device, and replaces the adapted operating system image with the new operating system image.

In some embodiments, the image creator stores the virtual file system on the external media device outside of the adapted operating system image and the common operating system image. In some embodiments, the streaming applications utilize user data stored in the virtual file system stored on the external media device. In some embodiments, the image creator analyzes the operating system of the host computing device to determine whether viruses, spyware, or corrupt files are present on the host computing device. In some embodiments, the image creator updates the adapted operating system image to reflect the external media device as the primary hard drive.

The details of various embodiments of the invention are set forth in the accompanying drawings and description below.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION

Figure 1A:
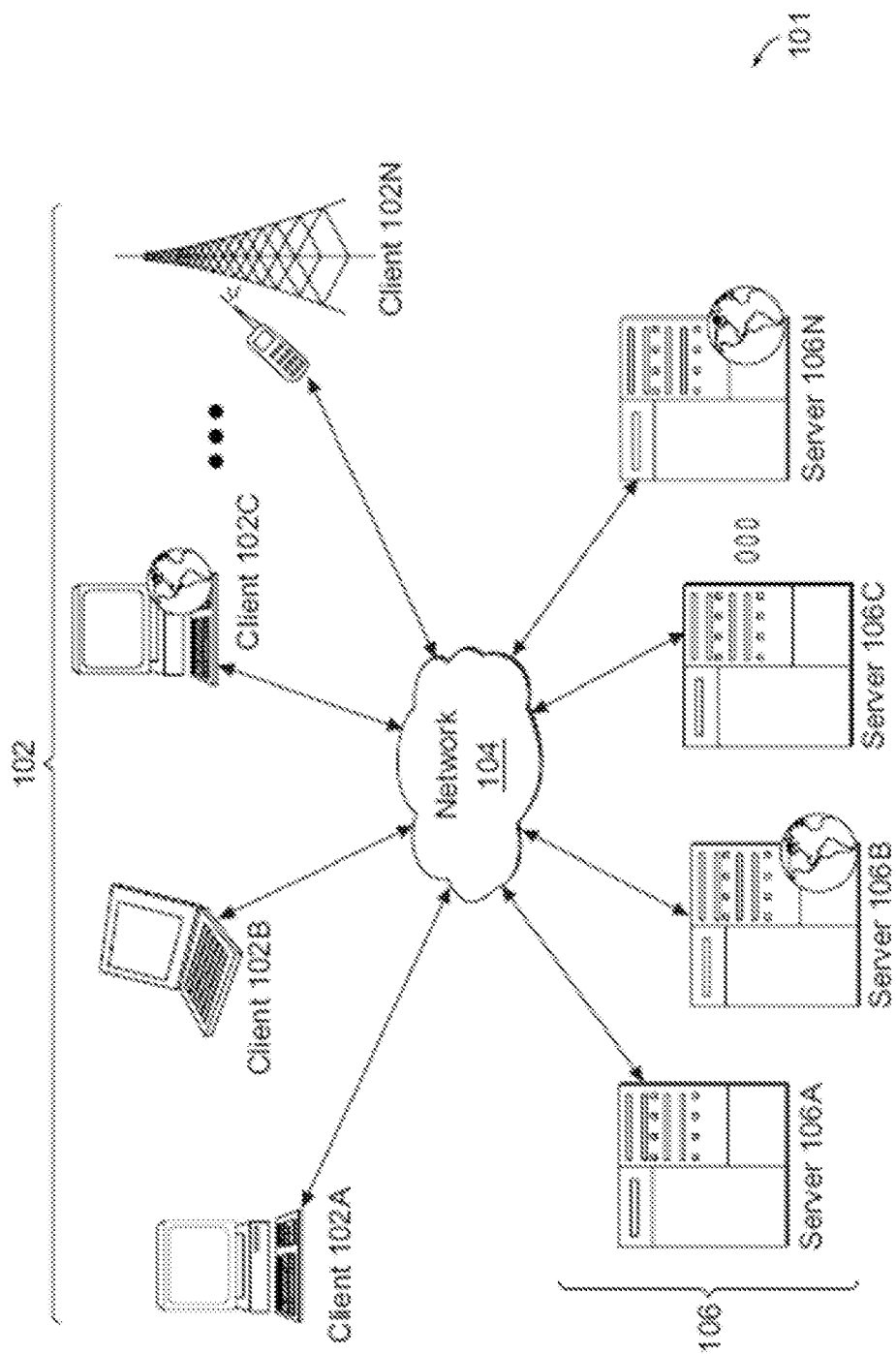
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that is in communication with one or more servers 106A-106N (generally referred to herein as "server(s) 106"). Installed in between the client machine(s) 102 and server(s) 106 is a network.

In one embodiment, the computing environment 101 can include an appliance (Not Shown) installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by anyone of the following terms: client machine(s) 102; client(s); client computer(s); client device(s); client computing device(s); local machine; remote machine; client node(s); endpoint(s); endpoint node(s); or a second machine. The server 106, in some embodiments, maybe referenced by anyone of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any-one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by anyone of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute anyone of the following applications: a thin-client application using a thin-client protocol to transmit application display data to a client; a remote display presentation application; any portion of the CITRIX ACCESS SUITE by Citrix Systems, Inc. like XenApp or XenDesktop; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes anyone of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple subnetworks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wire line network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be anyone of the following: AMPS; TDMA; CDMA; GSM; GPRS UMTS; or any other protocol able to transmit data among mobile devices.

Figure 1B:
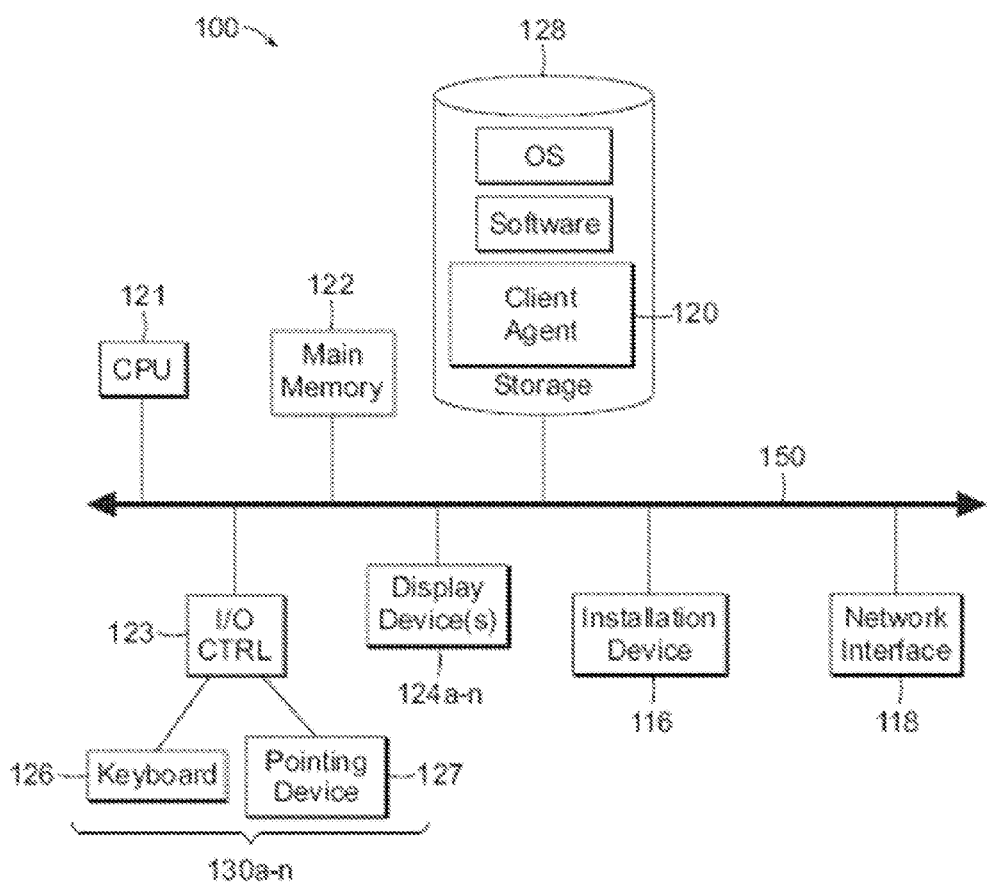
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
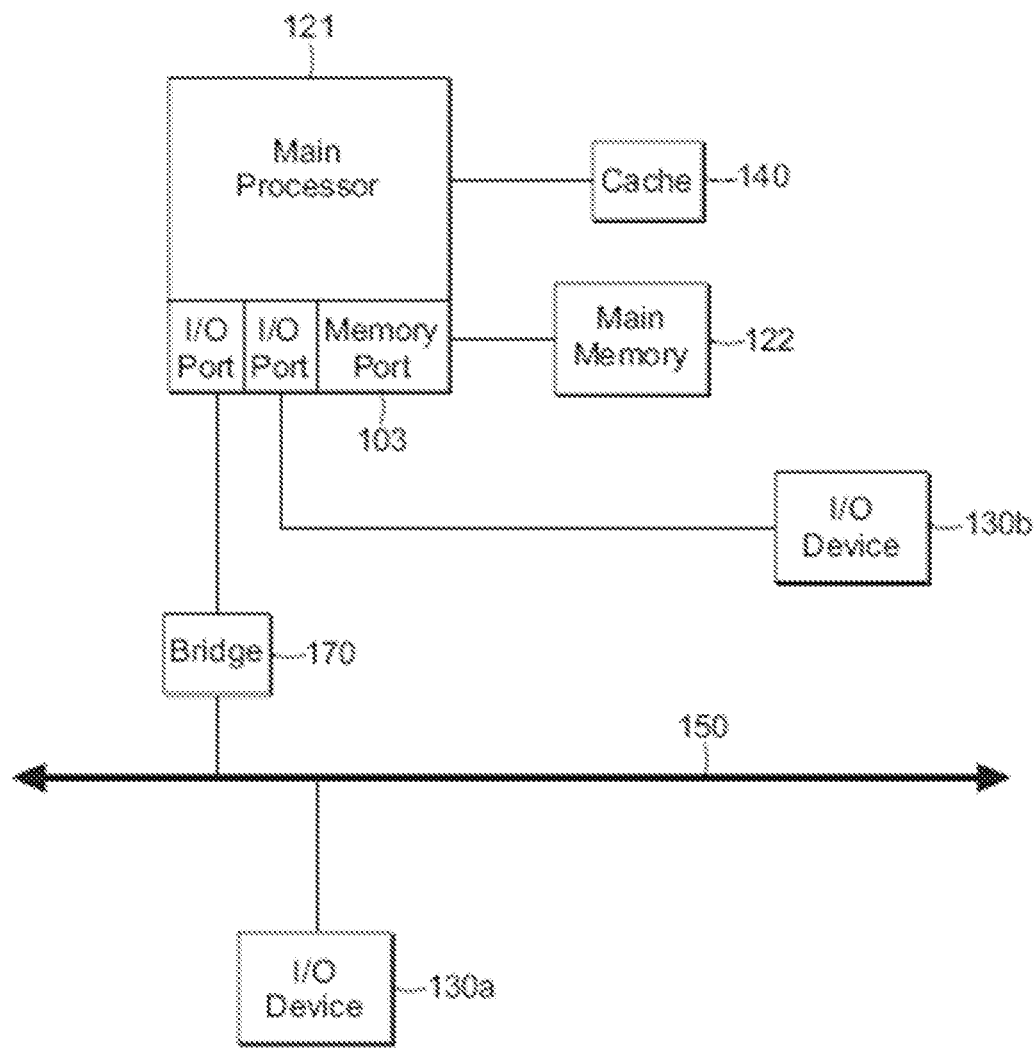

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device BOB, a main memory 122, and a cache memory 140. Included within the central processing unit 121, are I/O ports, a memory port 103, and a main processor.

Embodiments of the computing machine 100 can include a central processing unit 121 characterized by anyone of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be anyone of the following types of buses: a VESA VL bus; an ISA bus; an EISA bus; a Micro-Channel Architecture (MCA) bus; a PCI bus; a PCI-X bus; a PCIExpress bus; or a NuBus. Other embodiments of the computing machine 100 include an I/O device BOA-BON that is a video display 124 that communicates with the central processing unit 121. Still other versions of the computing machine 100 include a processor 121 connected to an I/O device BOA-BON via anyone of the following connections: HyperTransport, Rapid I/O, or InfiniBand. Further embodiments of the computing machine 100 include a processor 121 that communicates with one I/O device BOA using a local interconnect bus and a second I/O device BOB using a direct connection.

The computing device 100, in some embodiments, includes a main memory unit 122 and cache memory 140. The cache memory 140 can be any memory type, and in some embodiments can be anyone of the following types of memory: SRAM; BSRAM; or EDRAM. Other embodiments include cache memory 140 and a main memory unit 122 that can be anyone of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PCI00 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for anyone of the following installation devices 116: a CD-ROM drive, a CD-Rare drive, a DVD-ROM drive, tape drives of various formats, USB device, a bootable medium, a bootable CD, a bootable CD for GNU/Linux distribution such as KOPI®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FADDY), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise anyone of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include anyone of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS 7 and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in anyone of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; anyone of the PLAYSTATION family of devices manufactured by the Sony Corporation; anyone of the Nintendo family of devices manufactured by Nintendo Co; anyone of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as anyone of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be anyone of the following mobile computing devices: anyone series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
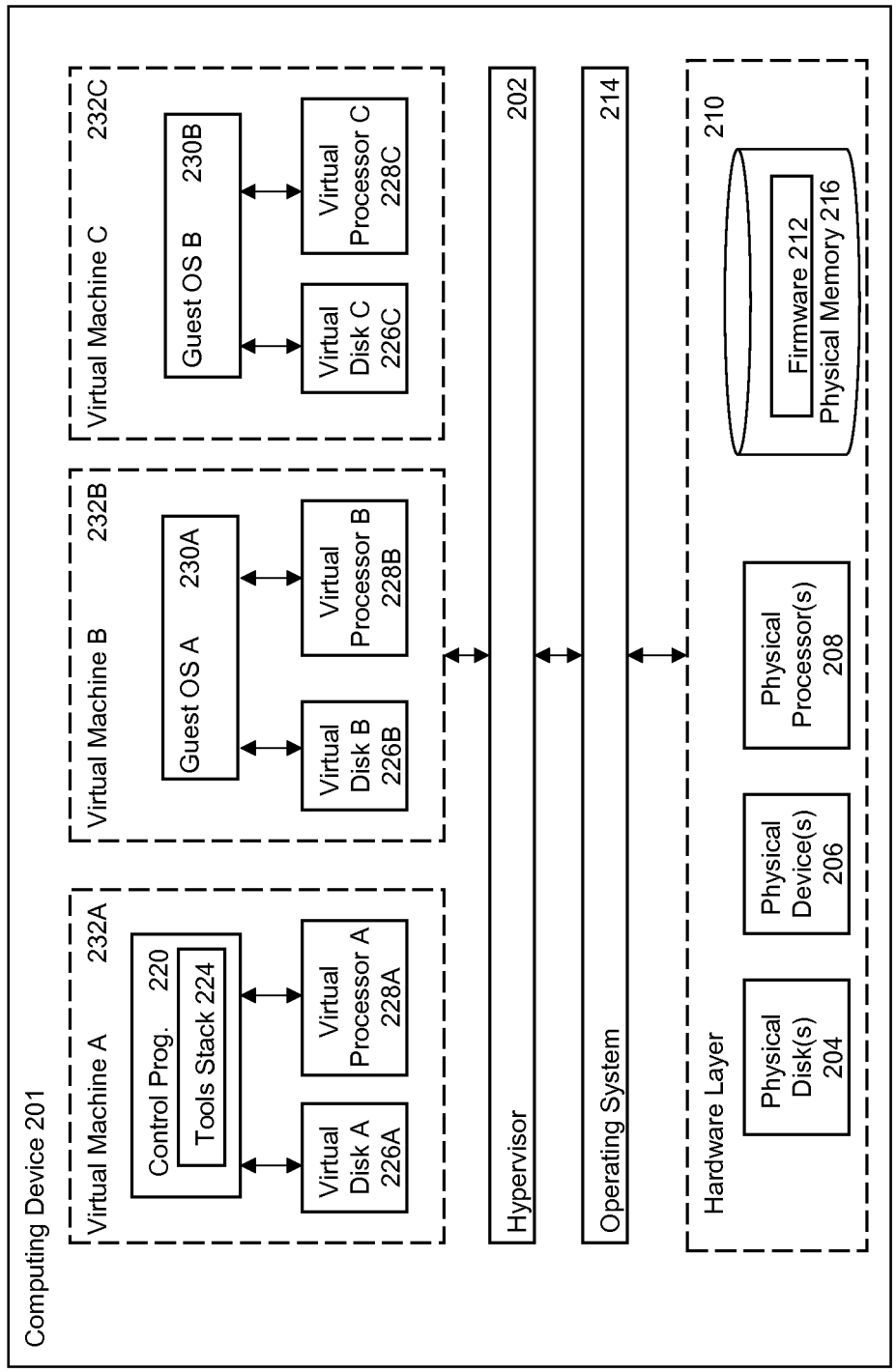
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201.

The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom O. The control program 220, in some embodiments, can be DOMAIN 0 or DOMO of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
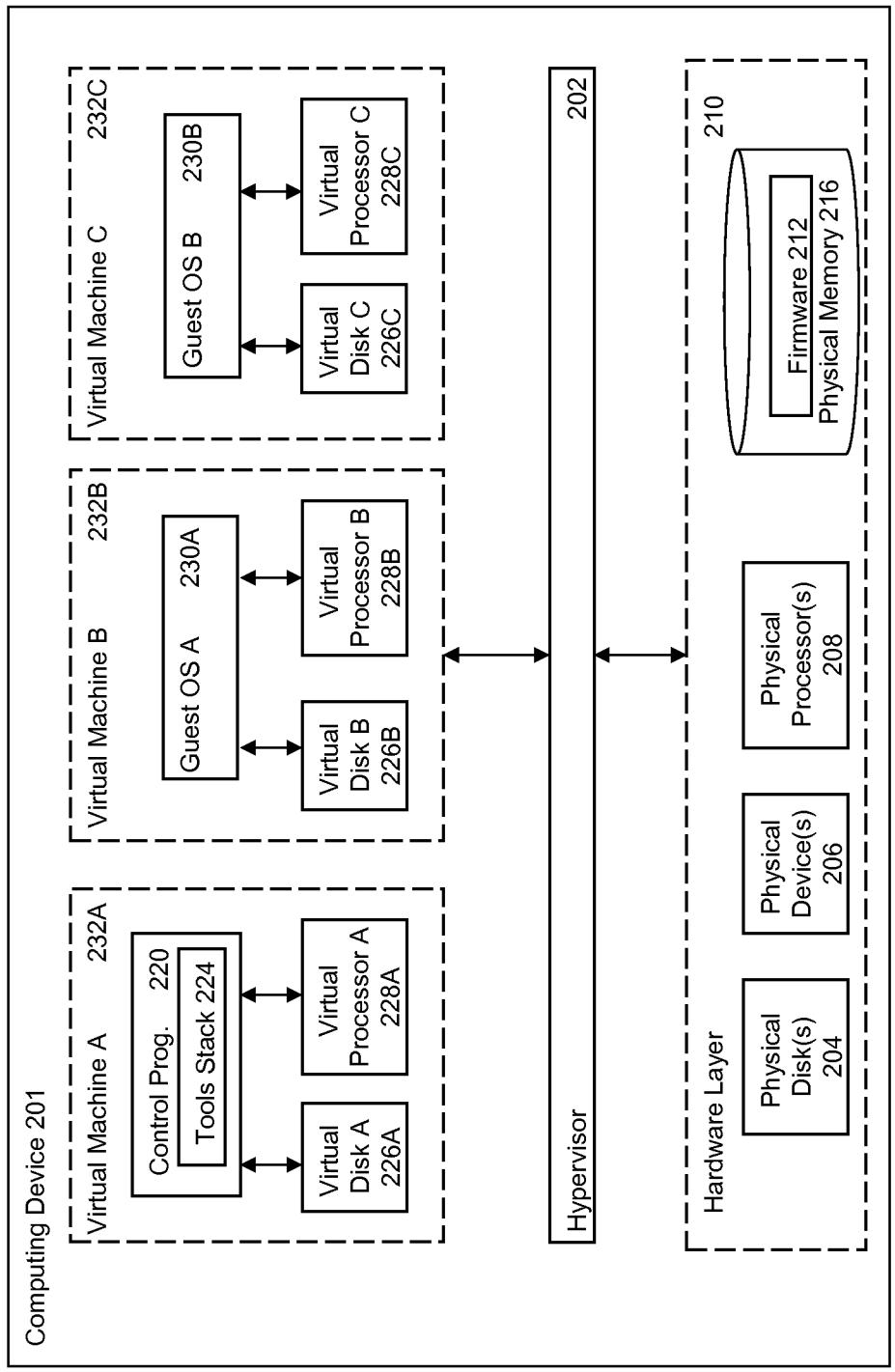

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3A:
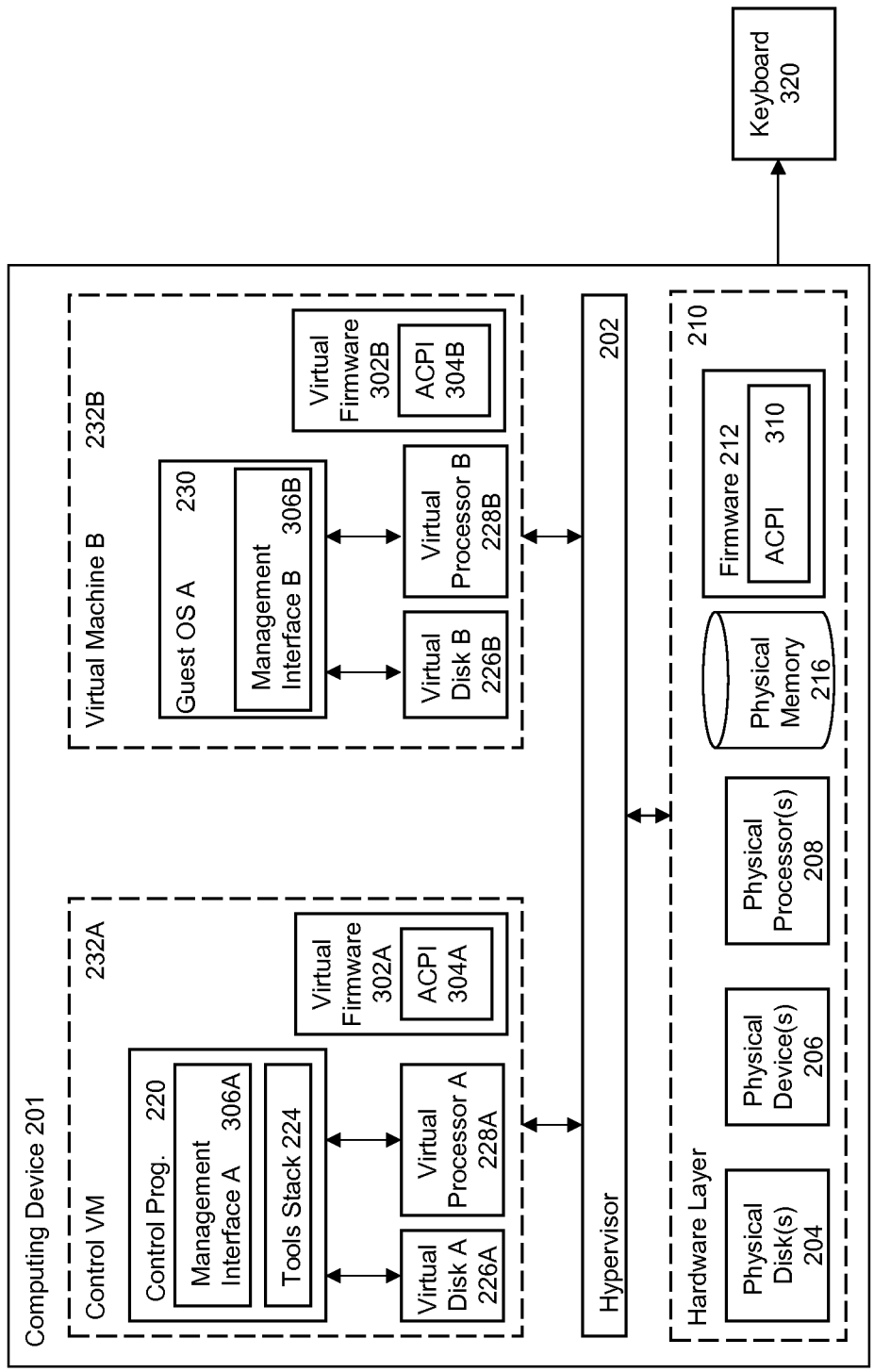
FIG. 3A and FIG. 3B are block diagrams that depict embodiments of a virtualization environment.

Illustrated in FIG. 3A is one embodiment of a virtualization environment that can handle interrupts generated in response to input received by the computing machine 201 from an input device. The computing machine can communicate with one or more input devices or devices such as any device described herein. In one embodiment, the computing device 201 can communicate with a keyboard 320. The firmware 212 of the computing device 201 can include an advanced power configuration interface (ACPI) layer 310, while the control program 220 can include a management interface 306A. Each virtual machine 232 can include virtual firmware 302A-B (generally 302), while each virtual firmware can include an ACPI layer 304A-B (generally 304.) Each guest operating system 230 or control program 220 can include a management interface 306A-B (generally 306.)

Further referring to FIG. 3A, and in more detail, in one embodiment the computing device 201 can communicate with one or more devices. In some embodiments, these devices can include a keyboard 320 that has keys. The keyboard 320, in some embodiments, can be considered a physical device 206 such that the keyboard 320 is logically included within the hardware layer 210. The keyboard 320 can communicate with the computing device 201 via a hardware driver able to receive raw data from the keyboard 320 and interpret the raw data into commands and data able to be interpreted by an operating machine or control program 220.

In some embodiments, the firmware 212 executing on the computing device 201, or more specifically on a processor 208 within the computing device 201, can include an advanced configuration and power interface (ACPI) layer 310. An ACPI layer 310 can be a layer 310 that provides one or more methods, objects and other management specifications and configurations for devices within the computing device 201. The ACPI layer 310 can further include objects, methods and specifications for managing power within the computing device 201. In some embodiments, the ACPI layer 310 can have exclusive control over all aspects of power management within the computing device 201 and can also configure devices within the computing device 201. The ACPI layer 310, in some embodiments, can include an ACPI specification that lists one or more operating states. These operating states can outline system configurations such as: which devices in the computing device 201 should receive power; how much power should be delivered to devices within the computing device 201; whether to configure devices within the computing device 201 to terminate or start one or more services or processes; and other such configurations.

In one embodiment, the ACPI layer 310 can include a plurality of tables that include objects and methods for interfacing the firmware 212 with an operating system requesting information about a device or an interrupt generated by a device. For example, were a device connected to or included within the computing device 201 to generate an interrupt, an operating system, control program 220 or other program executing on the computing device 201 can query the ACPI layer 201 tables for information about that device and therefore about the interrupt. This information can be included in the firmware 212, therefore the ACPI layer 310 tables can be used to obtain information about the device. This information can be scraped or obtained from the firmware 212, or this information can include objects or methods associated with the device.

In some embodiments, the firmware 212 can include objects and methods for each device included within the computing device 201. For example, the firmware 212 can include an object for the keyboard 320 that has a device ID specific to the keyboard 320. In this example, the keyboard object in the firmware 212 can also have methods that are specific to the keyboard 320. These methods can include functions and processes for receiving input from the keyboard 320, and functions and processes for sending commands to the keyboard 320. The ACPI layer 310, in some embodiments, permits operating systems, control programs and other applications and processes to access the keyboard object within the firmware 212 and to further access the keyboard methods within the firmware 212 by acting as an interface between the firmware 212 and the operating system or program.

As the computing device 201 can include firmware 212, so can the virtual machines 232 executing on the computing device 201. In one embodiment, a plurality of virtual machines 232 executing on the computing device 201 can include virtual firmware 302A-B (generally 302). Virtual firmware 302 can be a virtualized view of firmware 212 that executes on the computing device 201. In one embodiment, the control program 220 can generate virtual firmware 302 by analyzing the device objects within the firmware 212 on the computing device 201, and listing them in a table within the virtual firmware 302. The control program 220 can, in some embodiments, generate the virtual firmware 302 in response to a lifecycle event such as: startup of the control program 220; startup of a virtual machine 232; migration of a virtual machine 232; power down of the control program 220; power down of a virtual machine 232; boot-up of the computing device 201; or any other similar lifecycle event. The table included in the virtual firmware 302, in some embodiments, is similar to the firmware 212 in that it lists each device managed by the firmware 212 as well as an identifier of the device.

The virtual firmware 302 can, in some embodiments, include a virtual ACPI layer 304A-B (generally 304.) In some embodiments, the virtual ACPI layer 304 can function substantially similar to that of the computing device 201 ACPI layer 310 in that the virtual ACPI layer 304 can act as an interface between guest operating systems 230, control programs 220 and other applications, and the virtual firmware 302 on a machine 232.

In still other embodiments, the guest operating systems 230, control program 220 and other applications or services executing within the virtual machine(s) 232 can include a management interface 306A-B (generally 306.) In some embodiments, the management interface 306A-B can be a windows management interface that interfaces directly with the ACPI layer within firmware to receive information about a device. In one embodiment, the management interface 306 can interface directly with the virtual ACPI layer 304 to obtain object information and methods associated with or assigned to a device within the firmware 212. For example, the management interface 306 can communicate with the virtual ACPI layer 304 to obtain information about a keyboard interrupt generated when a user actuates a key on the keyboard.

While FIG. 3A illustrates a computing device 201 that uses a Type 1 hypervisor, in other embodiments, the computing device 201 can use a Type 2 hypervisor. Similarly, in some embodiments the computing device 201 can include any virtualization environment described herein.

Figure 3B:
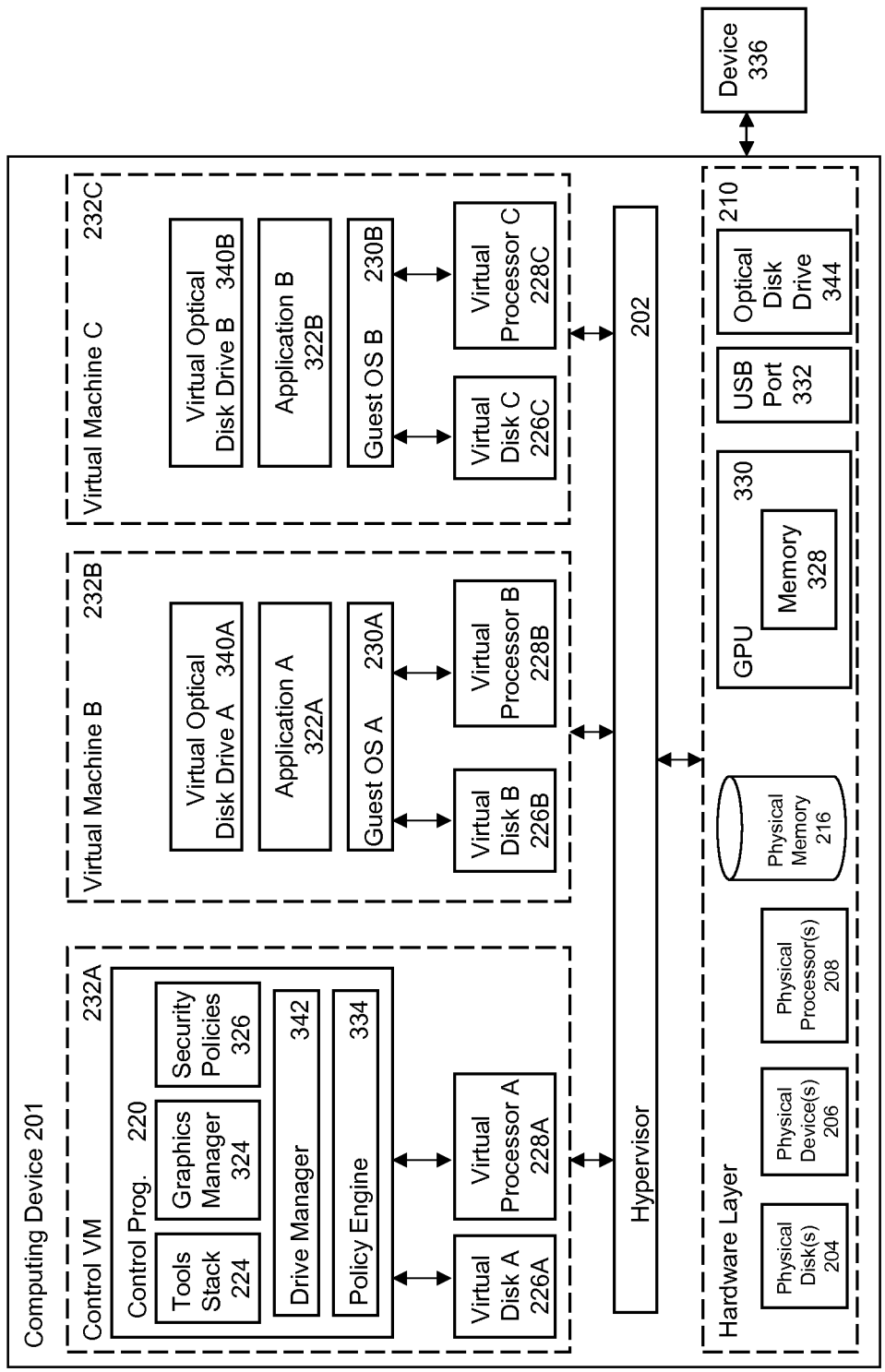

Illustrated in FIG. 3B is an embodiment of a virtualization environment configured to isolate secure screen graphics, execute a USB policy daemon, assign an optical disk drive, and perform other virtualization tasks. The computing device 201, in one embodiment, can communicate with a device 336. In other embodiments, the hardware layer 210 can include a graphics processing unit (GPU) 330 which can include graphics processing memory 328, a USB port 332 and at least one optical disk drive 344. In some embodiments, the control program 220 can execute or manage one or more additional modules or programs including a graphics manager 324, a drive manager 342 and a policy engine 334. Additionally, the control program 220 can access stored security policies 326. In some embodiments, virtual machines 323 executing on the computing device 201 can include one or more virtual optical disk drives 340A-B (generally 340), and can execute one or more applications 322A-B (generally 322.)

Further referring to FIG. 3B, and in more detail, although the computing device 201 illustrated in FIG. 3B has a virtualization environment that uses a Type 1 hypervisor, in other embodiments, the computing device 201 can use a Type 2 hypervisor. Similarly, in some embodiments the computing device 201 can include any virtualization environment described herein.

In some embodiments, the computing device 201 can communicate with one or more external devices 336. The devices 336 can be any device described herein. In some embodiments, the device 336 can communicate with the computing device 201 through the USB port 332. In other embodiments, the device 336 can communicate with the computing device 201 through other ports on the computing device 201.

The hardware layer 210 can, in some embodiments, include an optical disk drive 344. The optical disk drive 344 can be any optical disk drive, while in other embodiments the optical disk drive 344 can be any disk drive described herein. In some embodiments, the optical disk drive 344 can be a DVD drive; CD drive; CD R/W drive; or any other disk drive. While FIG. 3B illustrates an optical disk drive 344, in some embodiments the disk drive can be a magnetic disk drive.

The hardware layer 210 can further include a USB port 332 such as any port that uses the universal serial bus specification to establish communication between a device and the computing device 201.

A graphics processing unit (GPU) 330, in some embodiments, can be included in the hardware layer 210 of the computing device 201. The graphics processing unit 330 can be any processor able to render graphics. In some embodiments, the graphics processing unit 330 includes memory 328 that the graphics processing unit 330 can use to store rendered graphics and other graphics data. In other embodiments, the graphics processing unit 330 is allocated a portion of the physical memory 216 which the graphics processing unit 330 can use to store graphics information and rendered graphics.

In some embodiments, virtual machines 232 can include one or more virtual optical disk drives 340A-B (generally 340.) These virtual optical disk drives 340 can, in some embodiments, be a virtualized view of physical disk drives 344 on the computing device 201. Guest operating systems 230 executing on the virtual machines 232 can interact with the virtual disk drive 340 much the same way that the guest operating system 230 would interact with a physical disk drive 344. Therefore, the guest operating systems 230 can issue read and write commands to the virtual disk drive 340. In some embodiments, a drive manager 342 executing within the context of the control program 220 can intercept these read/write commands and send them to the physical disk drives 344.

Virtual machines 232, in some embodiments, can execute one or more applications 322A-B (generally 322.) These applications can be any application, or any application described herein. The applications 322 can interact with the guest operating systems 230, and can generate graphics and other application output.

The control program 220, in some embodiments, can include a graphics manager 324. The graphics manager 324 can act as a layer between the virtual machines 232, such that the graphics manager 324 can intercept requests issued to the physical GPU 330 by applications 322 executing on the virtual machines 232. While FIG. 3B illustrates a graphics manager 324 that executes within the context of the control program 220, in some embodiments the graphics manager 324 can be included within the tools stack 224. In some embodiments, the graphics manager 324 assigns graphics memory locations to applications 322 and/or virtual machines 232 executing on the computing device 201. In other embodiments, the graphics manager 324 segments the GPU memory 328 into secure and unsecure memory sections. In still other embodiments, the graphics manager 324 segments physical memory 216 assigned to the GPU 330 into secure and unsecure memory sections.

When an application 322 issues a request or command to the GPU 330, in some embodiments the graphics manager 324 can intercept that request and determine whether the command or request should be forwarded to the GPU 330. The graphics manager 324, in some embodiments, makes that determination by reviewing one or more security policies 326 to determine whether the application 322 has permission to write to memory or read from a particular area of memory. In some embodiments, the graphics manager 324 forwards identifying information about the application 322 and the virtual machine 232 on which the application 322 executes, to a policy engine 334. Based on the received information and one or more security policies 326, the policy engine 334 determines whether the command or request should be pushed through to the GPU 330 and relays this determination to the graphics manager 324.

In some embodiments, a drive manager 342 can execute within the control program 220. The drive manager 342, in some embodiments, can intercept read/write requests issued by applications executing within the virtual machines 232 and determine whether to pass those read/write requests to an optical disk drive 344 in the hardware layer 210. The drive manager 342 can also receive from the disk drive 344 a stream of transactions, and can intuit from the stream of transactions the current actions of the disk drive 344. In some embodiments, the drive manager 342 converts the transaction stream to a stream of commands and analyzes the generated command stream. Through this analysis, the drive manager 342 can determine whether the disk drive 344 is reading from a disk, writing to a disk, ejecting a disk, receiving a disk, idle, etc. Thus, the drive manager 342 can intuit from the transaction stream a state of the disk drive 344.

In one embodiment, a set of security policies 326 can be stored on the computing device 201 in a memory element or storage repository accessible to the control program 220. In some embodiments, the security policies 326 can be stored in a database on the computing device 201. The security policies 326, in some embodiments, can be a set of policies used by the control program 220, a policy engine 334, a graphics manager 324, or any other program to determine any of the following: whether a virtual machine 323 can access one or more memory elements, devices, processors or disks; whether a user can access one or more memory elements, devices, processors or disks; whether a device should be made available to one or more virtual machines 232; whether one or more commands generated by an application executing within a virtual machine 232 should be forwarded to a device on the computing device 201; and whether one or more requests generated by an application executing within a virtual machine 232 should be forwarded to a device on the computing device 201.

Similarly, in some embodiments a policy engine 334 executing on the computing device 201 can use the security policies 326 to determine whether one or more actions are permitted. In some embodiments the policy engine 334 can operate in lieu of other programs executing within the context of the control program 220. In other embodiments, the policy engine 334 can operate in conjunction with the other programs.

Figure 4:
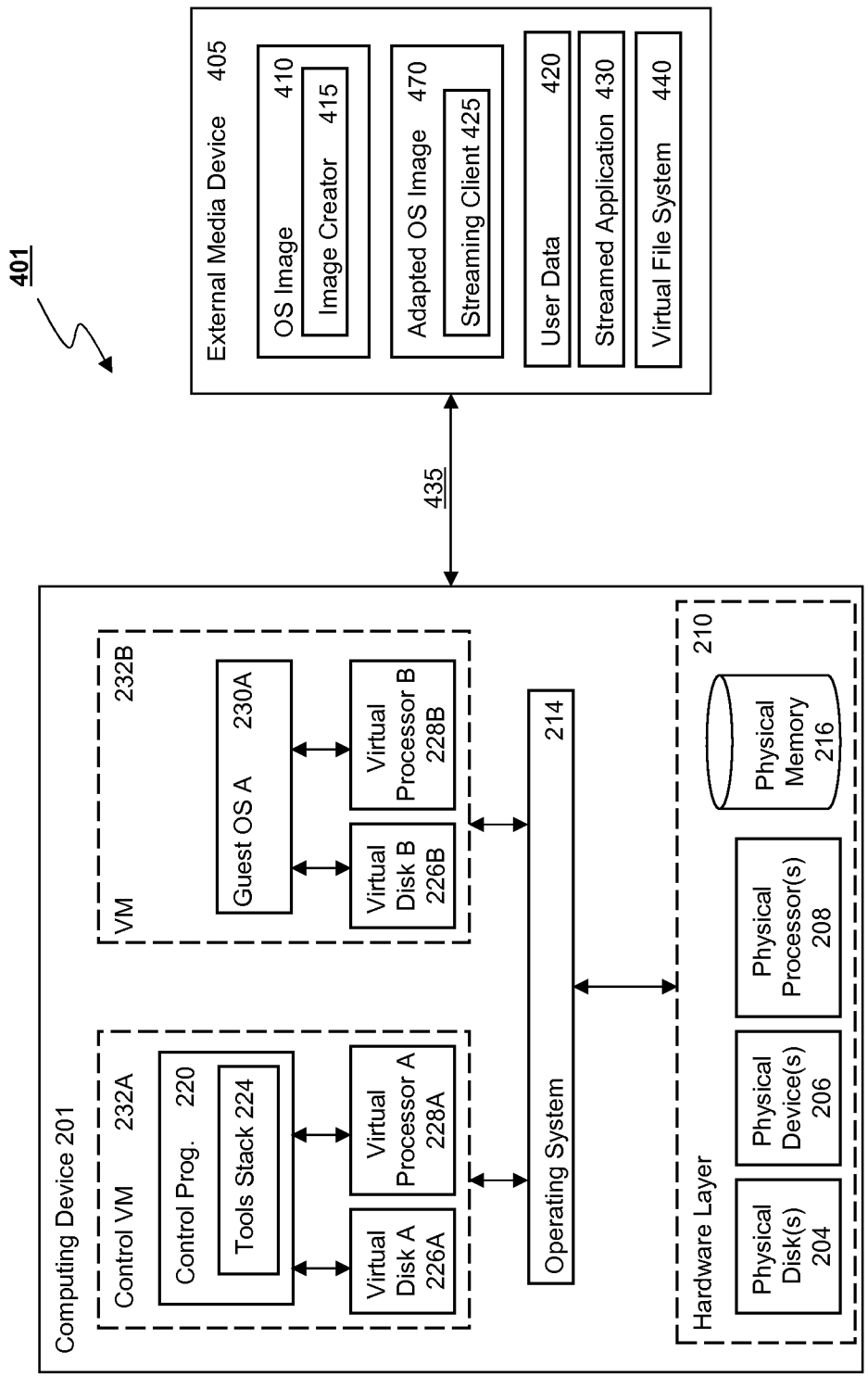
FIG. 4 is a block diagram that depicts an embodiment of a virtualization environment booting from an external media device.

Illustrated in FIG. 4 is one embodiment of a virtualization system 401 that can boot a secure virtual environment from an external media device 405. The system 401 includes a computing device 201 that executes at least one operating system 214/230, and that includes a hardware layer 210 that includes at least one or more physical disks 204, one or more physical devices 206, one or more physical processors 208 and a physical memory 216. The computing device 201 can communicate with an external media device 405 via a communicative connection 435 between the computing device 201 and the external media device 405. The external media device 405 can include a common operating system images 410, an adapted OS image 470, a streaming client 425 and an image creator 415. The external media device 405 can store user data 420 and one or more application files 430. The virtualization environment 401 can further include a virtual file system 440.

Further referring to FIG. 4, and in more detail, the virtualization environment 401 can include a computing device 201 such as any computing device. In some embodiments the virtualization environment 401 can include any computing device 201 described herein. While FIG. 4 illustrates a virtualization environment 401 that includes a single computing device 201, in other embodiments the virtualization environment 401 can include one or more computing devices 201.

The hardware layer 210, in some embodiments, can include any hardware device. In other embodiments, the hardware layer 210 can include one or more physical disks 204, one or more physical devices 206, one or more physical processors 208 and a physical memory 216. The physical disks 204 can be any physical disk described herein, the physical devices 206 can be any physical device described herein, the physical processors 208 can be any process described herein and the physical memory 216 can be any memory element described herein.

In some embodiments, the computing device 201 can execute an operating system 214 directly on the one or more processors 208 included in the computing device 201. In other embodiments, the host operating system 230 can be a guest operating system 230 executing on a virtual machine 232 on the computing device 201. The operating system 230, in this embodiment, is accessible via a control program 220 executing on the computing machine 201.

The external media device 405 can be any media device. In some embodiments, the external media device 405 is a USB external storage device (e.g. a USB memory stick). In other embodiments, the external media device 405 can be: an external hard drive; a writeable compact disk (CD); a writeable digital versatile disk (DVD); a network disk drive; or any other external media device.

In some embodiments, the external media device 405 can communicate with the computing device 201 via a communication connection 435. The communication connection 435, in some embodiments, can be a network such as any network 104 described herein. In other embodiments, the communication connection 435 can be a connection created via a USB port on the computing device 201. In still other embodiments, the communication connection 435 can be a connection created via any communication port on the computing device 201.

The external media device 405 can include an image of an operating system 410. The OS image 410 can be a common OS image 410 that can be booted from the external media device 405, and that can execute an image creator 415 on the external media device 405. In some embodiments, the common OS image 410 can be a base operating system image that includes a boot program that permits the OS image 410 to boot on the external media device 405. In one embodiment, the common OS image 410 can include a base suite of standard drivers including a universal serial bus (USB) driver, a network driver, and any other driver required to create a communication connection between the external media device 405 and the computing device 201. In some embodiments, the programs, applications and executable instructions on the external media device 405 can be executed by the one or more processors 208 on the computing device 201. In some embodiments, the OS image 410 is a base image including universal basic drivers that can access the widest array for devices in the hardware layer 210. In some embodiments, the common OS image 410 is sufficiently functional to permit the image creator 415 to execute on any type of host computing device 201.

The common OS image 410 may be only sufficiently functional to boot on the host computing device 201 and execute the image creator 415. In some embodiments, the common OS image 410 may be a completely functional OS image comprising personalized settings and applications of the user. In some embodiments, the common OS image 410 may include the image creator 415 in the image 410. In other embodiments, the image creator may exist on the external media device 405 but outside of the common OS image 410. In still other embodiments, the image creator 415 may be stored on a server and the OS image 410 will execute the image creator 415 over the network.

The adapted OS image 470 can, in some embodiments, include parts of an image of the operating system 214/230 executing on the computing device 201. Once the external media device 405 uses the image creator program 415 to update the adapted OS image 470 to include attributes of the operating system 214/230 executing on the computing device 201, the updated adapted OS image 470 can then include attributes and elements of the operating system 214/230 executing on the computing device 201. Thus, in some embodiments, the adapted OS image 470 can include at least a portion of the drivers, configurations, application files, and other attributes of the operating system 214/230 executing on the computing device 201.

The image creator program 415 executes in the common OS image 410 loaded and booted by the host computing device 201. In some embodiments, the image creator 415 executes within the context of the common OS image 410 such that the common OS instantiates an instance of the image creator 415 when the common OS 410 boots. In other embodiments, the image creator program 415 can generate an adapted OS image 470 from the operating system 214/230 executing on the computing device 201. The adapted OS image 470, in some embodiments, can be an OS image that includes an image of the OS 214 of the host computing device 201 updated with the files, programs, configurations and services of the operating system 214/230 executing on the computing device 201. When executing, the creator program 415 can access the hardware resources in the hardware layer 210 of the computing device 201. Thus, the image creator 415 can access the physical memory 216 on the computing device 201 and copy one or more files from the physical memory 216 to the external media device 405.

In some embodiments, the image creator 415 can analyze the operating system 214/230 of the computing device 201 to determine whether the adapted OS image 470 on the external media device 405 matches up with the operating system 214/230 of the computing device 201. When, in some embodiments, the image creator 415 determines that the adapted OS image 470 of the external media device 405 matches up with the operating system 214/230 of the computing device 201, the image creator 415 will not update the adapted OS image 470 of the external media device 405. When, in other embodiments, the image creator 415 determines that the adapted OS image 470 of the external media device 405 does not match up with the operating system 214/230 of the computing device 201, the image creator 415 can update the adapted OS image 470 of the external media device 405 with an image of the operating system 214/230 of the computing device 201. In still other embodiments, the image creator 415 can delete the adapted OS image 470 and copy an image of the computing device 201 operating system 214/230 upon determining the adapted OS image 470 does not match the computing device 201 operating system 214/230. In some embodiments, the image creator 415 creates a new adapted OS image 470 if one derived from the OS of the host computing device 201 does not exist on the external media device 405. In some embodiments, multiple adapted OS images 470 for different computing devices are stored on the external media device 405. In other embodiments, the multiple adapted OS images 470 for different computing devices are stored on a server and accessed by the client agent 415 over a network.

The external media device 405 can, in some embodiments, include a streaming client 425 which can be used to stream applications from an external storage repository or computer, or can be used to stream the adapted OS image 470 and/or application files and data from the external media device 405 to the computing device 201. In some embodiments, the streaming client 425 can isolate streamed applications from one another. In another embodiment the streaming client 425 can store user data. In some embodiments, the image creator 415 can install the streaming client 425 into the adapted OS image 470 of the external media device 405.

In some embodiments, the external media device 405 may include one or more existing adapted OS image 470. The adapted OS image 470 may be an image derived from the host computing device 201 during a previous session. In other embodiments, the adapted OS image 470 may be an image created from the OS of a different computing device. In some embodiments, the adapted OS images 470 derived from computing devices other than the host computing device are stored on the external media device 405. In other embodiments, only a pre-determined number of the adapted OS images 470 derived from computing devices other than the host computing device. Once the threshold is met, the client agent 415 may delete the oldest adapted OS image from the external media device. In some embodiments, adapted OS images 470 are purged from the external media device after a pre-determined number of days. In some embodiments, the number of days is established by the user. In other embodiments, the number of days is pre-determined by an administrator. In some embodiments, the user may "lock" an adapted OS image so that it cannot be deleted from the external media device. In some embodiments, the client agent may permit only a set number of adapted OS images to be stored on the external media device. In some embodiments, the adapted OS image 470 may include a streaming client 425 in the image. In other embodiments, the streaming client 425 is stored outside of the adapted OS image 470. In some embodiments, the streaming client 425 is installed in the adapted OS image 470 by the image creator 415.

Upon installing the streaming client 425 into the adapted OS image 470, the client agent 415 client 425 can create a file system 440 on the external media device 405 but outside of the adapted OS image 470. In some embodiments, the virtual file system 440 is stored external to the common OS image 410. This external file system 440, in some embodiments, can be a file system for storing user data 420. In still other embodiments, the file system 440 can be used to store application files 430.

The user data 420, in some embodiments, can be a virtual file system 440 for storing user data. In some embodiments, application data can be stored along with the user data 420 in the file system 440. In other embodiments, user data 420 can include user configurations, user setting, user application files, user data and other user information.

In some embodiments, the external media device 405 can include streamed applications 430. While FIG. 4 illustrates an external media device 405 that includes streamed applications 430, in some embodiments the external media device 405 may not include streamed applications 430. The streamed applications 430 can include stub application files or skeleton applications, full applications, or a portion of the application files required to execute an application. In some embodiments, the streamed applications 430 can be used in conjunction with streamed application data to execute a particular application.

The virtualization environment 401, in some embodiments, can include any combination of user data 420, streamed applications 430, an adapted OS image 410, a virtual file system 440 and the hardware 210 of the host computing device 201.

Figure 5A:
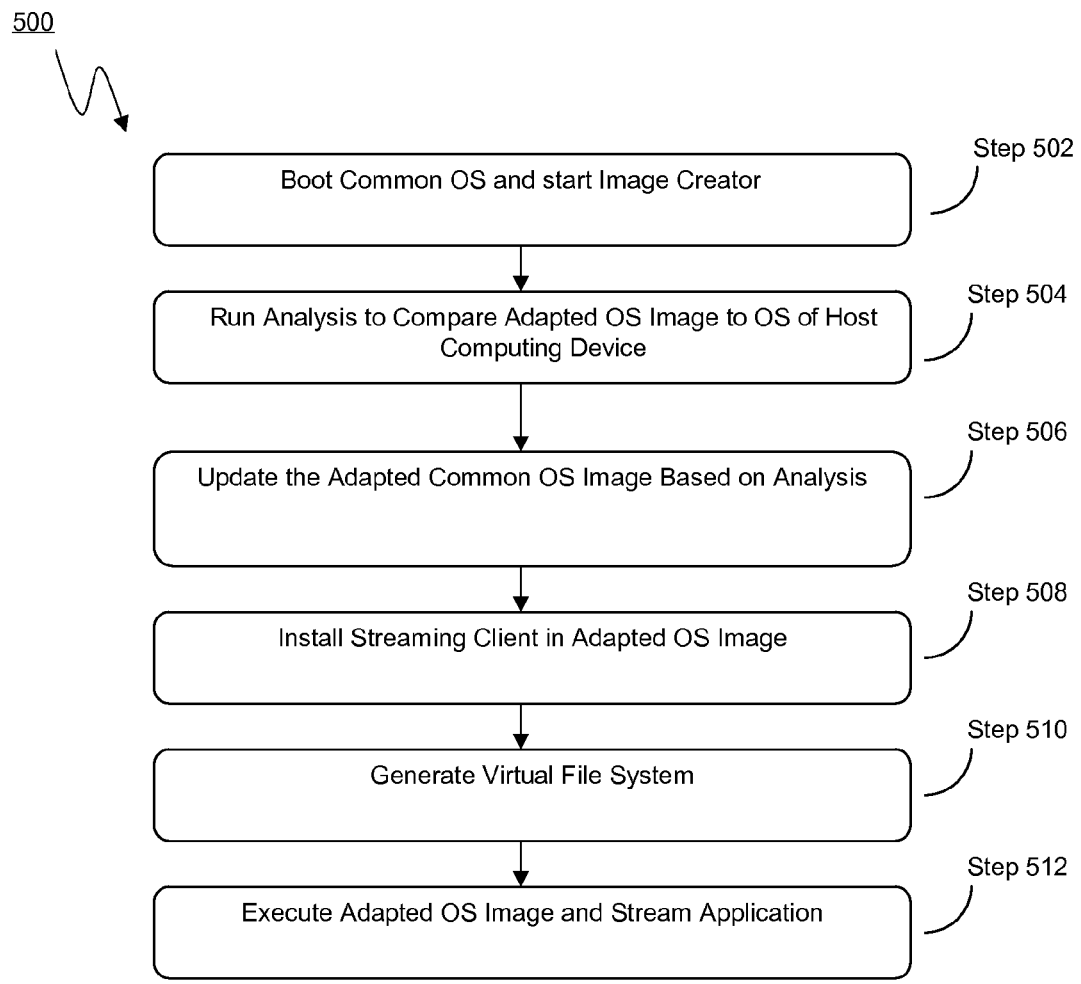
FIG. 5A and FIG. 5B are flow diagrams that depict embodiments of methods for generating a secure virtualization environment bootable from an external media device without modifying the host device.

Illustrated in FIG. 5A is one embodiment of a method 500 for creating a secure virtualization environment bootable from an external media device 405. The common OS image 410 on the external media device 405 boots and executes the image creator 415 on the host computing device 201 (Step 502). The image creator 415 runs a host computing device 201 analysis to determine the version of OS on the internal physical disk 204 (Step 504). Based on the analysis, the image creator 415 updates the adapted OS image 470 (Step 506), and installs the streaming client 425 into the adapted OS image 470 (Step 508). The client agent 415 generates a virtual file system (Step 510). The adapted OS image 470 executes and the user of the computing device 201 can begin streaming applications (Step 512).

Further referring to FIG. 5A, and in more detail, in one embodiment the common OS image 410 on the external media device 405 is executed by the processor(s) 208 on the computing device 201 which in turn causes the image creator 415 to begin executing (Step 502). In some embodiments, once a connection between the external media device 405 and the computing device 201 is established, the processors 208 on the computing device 201 execute the OS image 410 on the external media device 405. In other embodiments, the processors 208 begin executing the OS image 410 upon receiving a start command or other initialization command from a user. The OS image 410, upon starting the boot process, can cause the image creator 415 to execute. Thus, while executing the OS image 410, the processors 208 can also execute the image creator 415. In some embodiments, when the image creator 415 begins executing, the image creator 415 accesses the hard disk(s) 204 of the computing device 201.

The image creator 415, in some embodiments, carries out an analysis of the hard disk(s) 204 of the computing device 201 (Step 504). This host computing device analysis, in some embodiments, can determine whether the OS 214/230 executing on the host computing device 201 is substantially the same as the adapted OS image 470 on the external media device 405. In some embodiments, the image creator 415 compares the version of the operating system to the version of the operating system of the adapted OS image 470. In other embodiments, after the image creator 415 determines the version of the operating system 214 is the same for the host computing device 201 and the adapted OS image 470, the image creator 415 compares the registries and/or files of the host operating system to the OS image 410 to identify any additions or removals of applications or software or hardware components. In some embodiments, if the client agent 415 identifies that the operating system of the host device 201 has newly installed software or hardware, the client agent notes those additions and determine whether to modify the adapted OS image 470 to correspond to the OS of the host device. In some embodiments, the adapted OS image 470 is updated responsive to receiving user instructions via a dialog box, command prompt, or other means of receiving information from the user. In other embodiments, if the image creator 415 identifies that the host device 201 has removed software or hardware from its system, the client agent 415 would remove the corresponding data from the adapted OS image 470. In some embodiments, the client agent 415 would automatically remove the data from the adapted OS image 470. In other embodiments, the client agent 415 would remove the data from the adapted OS image 470 only after receiving instructions from the user, either through an explicit command or other input from the user. In some embodiments, the client agent 415 may move the data identified by the client agent 415 to a different folder in the virtual file system 440 on the external media device 405 or a location external to the external media device 405 such as a network server or database.

In one example, in a previous instance of using the external media device 405 to boot a secure virtualization environment, the adapted OS image 470 may have been updated by the image creator 415 to include an image of the OS 214/230 executing on the computing device 201. In this instance, the adapted OS image 470 of the external media device 405 includes parts of an image of the OS 214/230 executing on the computing device 201. Further, in this instance the image creator 415 does not update the adapted OS image 470. In another instance, the adapted OS image 470 may not include an image of the OS 214/230 executing on the host computing device 201. Thus, the adapted OS image 470 is replaced or updated to include such an image. Running the analysis on the hard disk(s) 204 of the computing device 201 can allow the image creator 415 to determine what version of OS is reflected in the adapted OS image 470. The version of OS can further allow the image creator 415 to determine whether to update the adapted OS image 470 of the external media device 405. In some embodiments, the analysis can include determining whether viruses, spyware or corrupt files are present on the computing device 201. In some embodiments, the client agent 415 removes the viruses, spyware or corrupt files on the computing device 201 automatically. In other embodiments, the client agent 415 removes or modifies the identified files only after receiving instructions from the user. In other embodiments, the client agent 415 does not modify the host machine 201 but stores the data related to the viruses, spyware or corrupt files in a database or other storage. In some embodiments, the client agent 415 removes any extraneous or outdated files automatically, to further reduce the size of the adapted OS image 470. In other embodiments, prior to any modification of the adapted OS image 470, the client agent 415 prompts the user to determine whether to remove or delete any data or files.

When, in some embodiments, the image creator 415 determines the adapted OS image 470 should be updated, the image creator 415 can update the adapted OS image 470 according to the OS 214/230 executing on the computing device 201 (Step 506). In one embodiment, updating the adapted OS image 470 can include erasing the instance of the adapted OS image 470 on the external media device 405 and replacing it with an image of the OS 214/230 of the computing device 201. Deleting the OS image 470 can, in some embodiments, include preserving user data 420. In other embodiments, updating the adapted OS image 470 can include updating the base OS image 410 with the image of the OS 214/230 of the computing device 201. The image creator 415, in one embodiment, can reduce or eliminate files from the OS image of the OS 214/230 of the computing device 201 to remove duplicated and unnecessary files. By doing this, the image creator 415 can reduce the size of the OS image. Further, reducing the files can include eliminating viruses, spyware and any corrupt files. In still other embodiments, updating the adapted OS image 470 can include making the common OS image 470 the C drive or the main drive of the virtualization environment.

Upon updating the adapted OS image 470 to include an image of the OS of the computing device 201, the image creator 415 can install the streaming client 425 into the adapted OS image 470 (Step 508). In some embodiments, the image creator 415 boots the updated, adapted OS image 470 before installing the streaming client 425. The streaming client 425, in some embodiments, can be installed directly into the adapted OS image 470. In other embodiments, the streaming client 425 can be streamed from the external media device 405 or from another location over the network 104.

The client agent 415, in some embodiments, can generate a virtual file system to store user data 420 on the external media device 405 (Step 510). In some embodiments, the streaming client 425 can generate the virtual file system, while in other embodiments the image creator 415 can generate the virtual file system. The virtual file system, in some embodiments, can be generated on the external media device 405 but outside of the common OS image 410. In some embodiments, the virtual file system is synchronized via the network with an existing virtual file system 440 stored on a different device. In some embodiments, the virtual file system is synchronized with the existing virtual file system upon creation on the external media device 405. In other embodiments, the virtual file system is synchronized with the existing virtual file system upon connection to a host device with network and internet capabilities.

Upon generating the adapted OS image 470, the OS image 470 can be booted and applications can be streamed to the created virtualization environment (Step 512). In some embodiments, streaming applications can include executing applications using a combination of at least a portion of the user data 420 and/or the streamed application data 430, and the application files streamed to the external media device 405. In other embodiments, streaming the application files can further include streaming the application files to processors 208 of the computing device 201. In some embodiments, the streaming applications can include executing applications from a network server. In other embodiments, the streaming client streams applications over the network from another location. In some embodiments, the streaming client streams applications using any combination of the techniques and methods described herein.

In embodiments where the external media device 405 already includes an image 470 of the OS 214/230 executing on the computing device 201, the image creator 415 can first determine whether the image was created from the OS of the host machine 201, and can then boot from the adapted OS image 470 on the external media device 405. Booting from the external media device 405 and performing the analysis can reduce the risk of exposing application files and the adapted OS image 470 to viruses that may be present on the computing device 201. In some embodiments, the client agent 415 updates the adapted OS image 470 to reflect the external media device 405 as the home drive or primary hard disk. In some embodiments, the update to reflect the external media drive 405 is responsive to a user request. In other embodiments, the update to reflect the external media drive 405 as the home drive is responsive to a pre-determined policy. In other embodiments, the user may specify how to display the external media drive 405, either by naming the external media drive using an alphanumeric string. In some embodiments, all of the host computing device 201 storage and drives are hidden from the user. In other embodiments the user is given READ access to the host computing device files, but is not permitted any WRITE access.

Figure 5B:
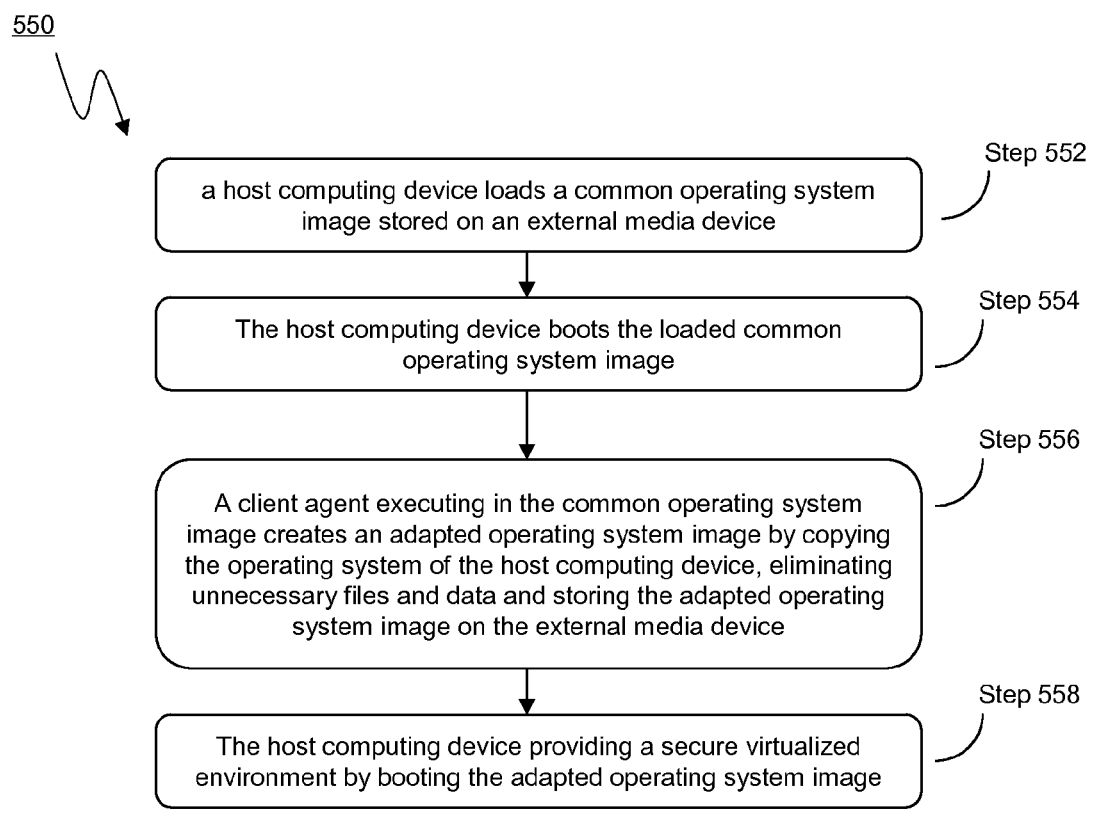

Now referring to FIG. 5B, an embodiment of a method 550 for creating a secure virtualization environment bootable from an external media device is depicted. In brief overview, at step 552, a host computing device loads a common operating system image stored on an external media device 405. At step 554, the host computing device 201 boots the loaded common operating system image 410. At step 556, a client agent 415 executing in the common operating system image 410 creates an adapted operating system image 470 by copying the operating system 214 of the host computing device 201, eliminating unnecessary files and data, and storing the adapted operating system image 470 on the external media device 405. At step 558 the host computing device 201 provides a secure virtualized environment by booting the adapted operating system image 470.

Now referring to FIG. 5B, and in more detail, at step 552, the host computing device 201 loads a common operating system image stored on an external media device. In some embodiments, the common operating system image 410 is loaded automatically. In other embodiments, the common OS image 410 is loaded responsive to a user request. In some embodiments, the common OS image 410 may be an old version of an adapted OS image 470. In other embodiments, the common OS image 410 is a base image with limited functionality.

At step 554, the host computing device boots the loaded common operating system image. In some embodiments, the common OS image 410 is booted automatically once loaded. In other embodiments, the common OS image 410 is booted responsive to a user request. In other embodiments, the common OS image 410 is booted responsive to a pre-determined policy. In some embodiments, the common OS image 410 is booted upon reaching a pre-determined time threshold.

At step 556, a client agent 415 executing in the common OS image 410 creates an adapted OS image 470 by copying the OS 214 of the host computing device 201, eliminating unnecessary files and data, and storing the adapted OS image on the external media device 405. In some embodiments, the common OS image automatically executes the client agent 415 upon booting. In some embodiments, the client agent is stored on the external media device 405. In other embodiments, the client agent 415 is stored on another computing device. The common OS image may execute the client agent 415 over the network 104. In some embodiments, the client agent 415 is stored on the external media device 405 but not in the common OS image 410. The common OS image 410 may execute the client agent 415 from any location it is stored.

In some embodiments, an adapted OS image 470 may be stored on the external media device 405 from a previous session. In some embodiments, the client agent 415 analyzes the operating system 214 of the host computing device 201 to determine if the adapted OS image 470 was derived from the OS of the host computing device 201. The client agent 415 may compare versions of the operating systems, checksums of existing files of the operating systems, unique global identifiers created by the client agent using various identifying information of the OS, or other similar identification methods. In some embodiments, the client agent determines that the adapted OS image 470 was not derived from the OS of the host computing device and the client agent 415 may create a new OS image from the host computing device and store it to the external media device 405. In some embodiments, the client agent 415 deletes the existing adapted OS image and the new OS image replaces the existing adapted OS image 470. In some embodiments, the existing adapted OS image 470 is moved to a different location on the external media device 405. In other embodiments, the existing adapted OS image 470 is transmitted over a network 104 and stored on a different computing device. In some embodiments, during the analysis conducted by the client agent 415, all existing adapted OS images stored on the external media device 405 are compared to the OS 214 of the host computing device 201 to determine if any were derived from the OS for the host computing device 201.

In some embodiments, if no adapted OS image 470 exists on the external media device 405 at the time of the analysis by the client agent 415, the client agent 415 creates a new OS image derived from the OS of the host computing device 201. The client agent 415 creates a disk image of the OS 214 and deletes all files that are unnecessary for the OS image to remain functional. For example, the client agent may delete from the image any user preferences saved in the OS 214, applications such as games, and any files or data stored on the hard drive, such as Microsoft Word or Excel documents saved on the hard drive by another user. In some embodiments, the client agent 415 may prompt the user to determine which applications to include in the adapted OS image 470 that exist on the host computing device. In some embodiments, none of the applications that exist on the host computing device are included in the adapted OS image 470. The adapted OS image 470 may include only the base image and any hardware drivers for any devices associated with the host computing device 201, such as printers, monitors, wireless keyboards or mice, or similar devices. Once the client agent 415 completes the creation of the adapted OS image 470, it may save the image to the external media device 405. In some embodiments, the adapted OS image 470 may be saved to another computing device and accessed via the common OS image 410 over the network 104.

In some embodiments, if an adapted OS image 470 existed on the external media device 405 and after the analysis, the client agent 415 determined that the adapted OS image was derived from the OS 214 of the host computing device 201 from a previous session, the client agent identifies any differences in the adapted OS image 470 and the OS of the host computing device. If the client agent determines that the host computing device no longer has a component previously available (for example, if the host computing device no longer has an HP printer and is currently associated with a network printer), the client agent 415 will remove the identified component from the adapted OS image 470. In some embodiments, the client agent 415 will prompt the user prior to making any modifications to the adapted OS image 470. In other embodiments, the client agent 415 may automatically make modifications to the adapted OS image 470. In some embodiments, the automatic modifications to the adapted OS image 470 may be responsive to pre-existing policies. In some embodiments, the client agent may determine that no differences exist in the adapted OS image 470 and the OS of the host computing device 201. In some embodiments, the common OS image 410 and the adapted OS image 470 may be the same OS image. In other embodiments, the adapted OS image 470 and the common OS image 410 are distinct and different OS images.

At step 558, the host computing device 201 provides a secure environment bootable from an external media device by booting the newly created or updated adapted OS image 470.

In some embodiments, the client agent 415 installs a streaming client into the adapted operating system image 470. In some embodiments, the streaming client is automatically installed during the creation of the adapted OS image 470. In other embodiments, the streaming client 425 in installed in the adapted OS image during the analysis by the client agent 415. In some embodiments, the streaming client is executed from the external media device 405.

In some embodiments, the image creator 415 generates a virtual file system. In some embodiments, the virtual file system is stored on the external media device 405. In some embodiments, a virtual file system already exists on the external media device 405. In such cases, the client agent 415 may update the existing virtual file system 440. In other embodiments, a virtual file system 440 is created for each session in which the external media device 405 is connected to the host computing device 201. In some embodiments, the client agent 415 deletes the existing virtual file system 440 and generates a new virtual file system 440. In some embodiments, the client agent 415 prompts the user prior to modifying, deleting, or generating a new virtual file system 440. In other embodiments, the client agent 415 automatically modifies, deletes, or generates a virtual file system 440 responsive to existing policies.

In some embodiments, the streaming client 425 streams applications 430 stored on the external media device 405. In other embodiments, the streaming client 425 streams applications 430 stored on a server over a network 104. In some embodiments, the streaming client 425 stream applications 430 using a combination of information on the external media device 405 and information transmitted over a network 104.

In some embodiments, the virtual file system 440 may be stored on the external media device 405. In other embodiments, the virtual file system 440 may be stored on a server. In some embodiments, the virtual file system 440 may be stored using a combination of the external media device 405 and any other computing device excluding the host computing device. In some embodiments, the virtual file system 440 may be stored in the common OS image. In some embodiments, the virtual file system 440 may be stored in the adapted OS image 470. In some embodiments, the virtual file system 440 is stored on the external media device 405 outside the adapted OS image 470.

In some embodiments, the client agent 415 analyzes the OS 214 of the host computing device 201 to determine whether viruses, spyware, or corrupt files are present on the host computing device. If any malicious or corrupt files are present on the host computing device 201, the client agent 415 ensures that they are not transmitted to the external media device 405 or included in the adapted OS image 470. In some embodiments, the client agent 415 may remove the corrupt or malicious files from the host computing device 201. In some embodiments, the client agent 415 may prompt the user to prior to removing or modifying the host computing device 201. In some embodiments, the client agent 415 collects information regarding the malicious or corrupt files and stores the information on the external media device 405. In some embodiments, the client agent 415 transmits the information to another computing device.

In some embodiments, the client agent 415 automatically updates the adapted operating system image 470 to reflect the external media device 405 as the primary hard drive. In some embodiments, the client agent 415 prompts the user for an alphanumeric string to name the external media device 405. In other embodiments, the client agent 415 updates the adapted OS image 470 to display the external media device 405 as the primary drive, usually denoted as the C: drive.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for creating a secure virtualization environment on a host computing device, without modifying the host device, the secure virtualization environment bootable from an external media device, the method comprising:
    copying, by a client agent executing in a common operating system image stored on the external media device, an operating system of the host computing device to create a copied operating system;
    comparing, by the client agent, the copied operating system of the host computing device to an operating system stored on an external media device;
    identifying, by the client agent, unnecessary files and data in the copied operating system of the host computing device;
    eliminating, by the client agent, the unnecessary files and data from the copied operating system of the host computing device; and
    creating, by the client agent, an adapted operating system image responsive to eliminating unnecessary files and data.

2. The method of claim 1, further comprising:
    installing, by the client agent, a streaming client into the adapted operating system image;
    generating, by the client agent, a virtual file system; and
    streaming, by the streaming client, applications from the secure virtualized environment.

3. The method of claim 2, further comprising storing, by the client agent, the virtual file system on the external media device outside of the adapted operating system image and the common operating system image.

4. The method of claim 2, further comprising utilizing, by the streaming applications, user data stored in the virtual file system stored on the external media device.

5. The method of claim 1, further comprising analyzing, by the client agent, the operating system of the host computing device to determine whether viruses, spyware, or corrupt files are present on the host computing device.

6. The method of claim 1, further comprising updating, by the client agent, the adapted operating system image to reflect the external media device as the primary hard drive.

7. The method of claim 1, further comprising determining, by the client agent, an existing adapted operating system image was not derived from the operating system of the host computing device and eliminating the existing adapted operating system image from the external media device.

8. A method for creating a secure virtualization environment on a host device, without modifying the host device, the secure virtualization environment bootable from an external media device, the method comprising:
    determining, by a client agent executing in the common operating system image, that an adapted operating system image on an external media device was derived from an operating system of the host computing device;
    identifying, by the client agent, differences between the operating system of the host computing device and the adapted operating system image, wherein the differences include unnecessary files and data in the adapted operating system image; and modifying, by the client agent, the adapted operating system image to correspond to the operating system of the host computing device.

9. The method of claim 8, further comprising:
installing, by the client agent, a streaming client into the adapted operating system image;
generating, by the client agent, a virtual file system; and
streaming, by the streaming client, applications from the secure virtualized environment.

10. The method of claim 9, further comprising storing, by the client agent, the virtual file system on the external media device outside of the adapted operating system image and the common operating system image.

11. The method of claim 9, further comprising utilizing, by the streaming applications, user data stored in the virtual file system stored on the external media device.

12. The method of claim 8, further comprising analyzing, by the client agent, the operating system of the host computing device to determine whether viruses, spyware, or corrupt files are present on the host computing device.

13. The method of claim 8, further comprising updating, by the client agent, the adapted operating system image to reflect the external media device as the primary hard drive.

14. A system for creating a secure virtualization environment on a host device, without modifying the host device, the secure virtualization environment bootable from an external media device comprising:
a host computing device providing a secure virtualized environment by booting an adapted operating system image; and
the external media device comprising:
an image creator
determining that the adapted operating system image was derived from an operating system of the host computing device;
identifying differences between the operating system of the operating system of the host computing device and the adapted operating system image, wherein the differences include unnecessary files and data in the adapted operating system image; and
updating the adapted operating system image responsive to the identification.

15. The system of claim 14, wherein the image creator installs a streaming client into the adapted operating system image; the image creator generates a virtual file system; and the streaming client streams applications from the secure virtualized environment.

16. The system of claim 15, wherein the image creator determines the adapted operating system image was not derived from the operating system of the host computing device, updates the adapted operating system image by creating a new operating system image using the operating system of the host computing device, and replaces the adapted operating system image with the new operating system image.

17. The system of claim 15, wherein the image creator stores the virtual file system on the external media device outside of the adapted operating system image and the common operating system image.

18. The system of claim 15, wherein the streaming applications utilize user data stored in the virtual file system stored on the external media device.

19. The system of claim 14, wherein the image creator analyzes the operating system of the host computing device to determine whether viruses, spyware, or corrupt files are present on the host computing device.

20. The system of claim 14, wherein the image creator updates the adapted operating system image to reflect the external media device as the primary hard drive.

* * * * *